US011871235B2

(12) United States Patent
Lee

(10) Patent No.: US 11,871,235 B2
(45) Date of Patent: Jan. 9, 2024

(54) SECURE URL SHORTENER FOR CHARACTER-LIMITED MESSAGES

(71) Applicant: Proofpoint, Inc., Sunnyvale, CA (US)

(72) Inventor: Thomas Lee, Kensington, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 265 days.

(21) Appl. No.: 17/192,873

(22) Filed: Mar. 4, 2021

(65) Prior Publication Data

US 2022/0141667 A1 May 5, 2022

Related U.S. Application Data

(60) Provisional application No. 63/107,022, filed on Oct. 29, 2020.

(51) Int. Cl.
*H04W 4/14* (2009.01)
*H04W 12/128* (2021.01)
*H04M 3/436* (2006.01)

(52) U.S. Cl.
CPC ......... *H04W 12/128* (2021.01); *H04M 3/436* (2013.01); *H04W 4/14* (2013.01)

(58) Field of Classification Search
CPC ..... H04W 4/14; H04W 12/128; H04M 3/436; G06F 16/748; G06F 16/955; G06F 16/9566; G06F 16/9554
USPC ......................................................... 726/24
See application file for complete search history.

(56) References Cited

U.S. PATENT DOCUMENTS

| 6,360,254 | B1 * | 3/2002 | Linden | ................ H04L 63/0807 |
| | | | | 707/E17.112 |
| 8,904,168 | B1 | 12/2014 | Emigh | |
| 10,686,826 | B1 | 6/2020 | Goutal et al. | |
| 2012/0214443 | A1 * | 8/2012 | Daigle | ................... H04L 9/3228 |
| | | | | 455/411 |
| 2013/0227662 | A1 * | 8/2013 | Crampton | ........... G06F 21/6209 |
| | | | | 726/6 |
| 2020/0021606 | A1 * | 1/2020 | Cardinal | ............. H04L 63/1433 |

FOREIGN PATENT DOCUMENTS

KR 20110130866 A 12/2011

OTHER PUBLICATIONS

May 19, 2022—(EP) Extended Search Report—App 21197254.2.
Jul. 24, 2023—(EP) First Examination Report—App 21197254.2.
Feb. 18, 2022—(EP) Partial Search Report—App 21197254.2.

* cited by examiner

*Primary Examiner* — Josnel Jeudy
(74) *Attorney, Agent, or Firm* — Banner & Witcoff, Ltd.

(57) ABSTRACT

Aspects of the disclosure relate to providing secure shortened URLs in character-limited messages. A computing platform may receive one or more character-limited messages sent to a user device. The computing platform may detect a URL within the one or more character-limited messages for replacement and generate a shortened URL corresponding to the detected URL, wherein a domain of the shortened URL is hosted by the message security system. The computing platform may then modify the one or more character-limited messages by replacing the URL with the shortened URL, and then cause transmission of the modified one or more character-limited messages to the user device. Next, the computing platform may receive, from the user device, a request to access the shortened URL, and redirect the user device to the detected URL corresponding to the shortened URL.

17 Claims, 8 Drawing Sheets

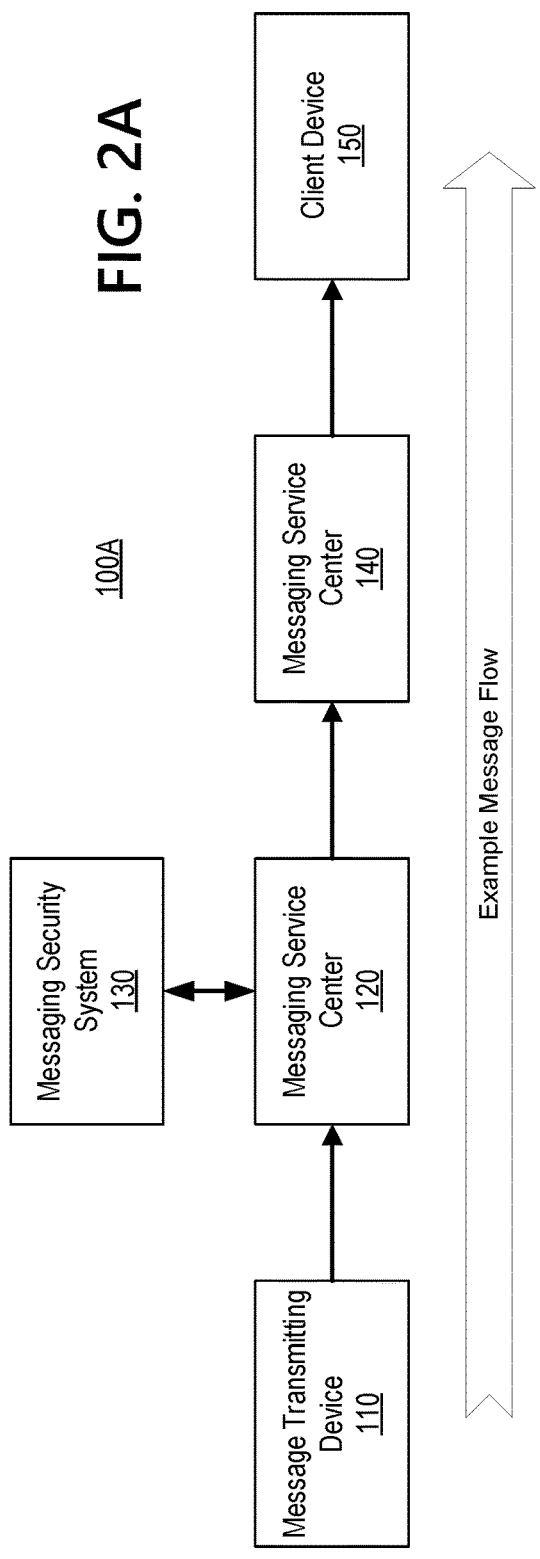
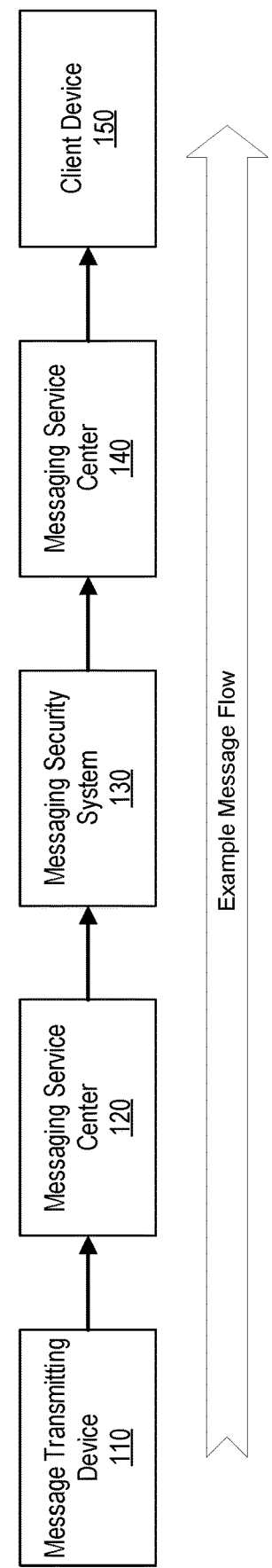

SECURE URL SHORTENER FOR CHARACTER-LIMITED MESSAGES

CROSS-REFERENCE TO RELATED APPLICATIONS

This application claims the benefit of and priority to U.S. Provisional Patent Application Ser. No. 63/107,022, filed Oct. 29, 2020, and entitled "URL-Defense Rewriting for URLs in SMS Message Bodies," which is incorporated by reference herein in its entirety.

TECHNICAL FIELD

Aspects of the disclosure relate to message processing and management systems, data processing methods, and communication systems and networks. In particular, one or more aspects of the disclosure relate to providing enhanced security features for messaging systems that send messages to user devices, including character-limited messages such as SMS messages.

BACKGROUND

Increasingly, organizations and individuals face various cybersecurity threats through electronic communications. While various solutions for combatting malicious messages delivered through email, for example, have been developed, these solutions are not always extendable to other forms of messaging, such as text messaging and other related communications. Because of the unique characteristics of text messaging and related types of electronic communications, efficient and effective solutions for combatting cybersecurity threats deployed through these types of electronic communications are needed.

SUMMARY

Aspects of the disclosure provide technical solutions that overcome one or more of the technical problems described above and/or other technical challenges. For instance, one or more aspects of the disclosure relate to receiving character-limited messages as they are being transmitted towards a user device, checking URLs that are contained within the messages, potentially replacing one or more URLs with corresponding secure shortened URLs that allow scanning of the content available at the URL before providing user access to the URL, and causing a modified message, with one or more of the URLs replaced by secure shortened URLs, to be sent onwards towards the user device. Then, when a user at the user device selects the secure shortened URL, the original URL can be retrieved, and the content available at the original URL scanned for malicious content, before redirecting the user device to the original URL.

In accordance with one or more embodiments, a computing platform having at least one processor, a communication interface, and memory may receive, via the communication interface, one or more character-limited messages sent to a user device; detect a URL within the one or more character-limited messages for replacement; generate a shortened URL corresponding to the detected URL, wherein a domain of the shortened URL is hosted by the message security system; modify the one or more character-limited messages by replacing the URL with the shortened URL; cause transmission of the modified one or more character-limited messages to the user device; receive, via the communication interface, from the user device, a request to access the shortened URL; and redirect the user device to the detected URL corresponding to the shortened URL. In some embodiments, the one or more character-limited messages comprise at least one of short message service (SMS) messages and multimedia messaging service (MMS) messages.

In one or more embodiments, the computing platform may detect the URL for replacement by detecting a URL within the one or more character-limited messages; and identify that the URL is not trusted, wherein replacing the URL with the shortened URL comprises replacing the URL in response to identifying that the URL is not trusted.

In one or more embodiments, the computing platform may generate the shortened URL by assigning an expiration to the shortened URL; and store an association between the shortened URL and the URL until at least the expiration. Additionally or alternatively, the computing platform may generate the shortened URL by generating a random token based on a maximum number of characters that can be transmitted in a single character-limited message; and generate a shortened URL comprising the domain and the generated random token. In some cases, a length of the random token is selected based on a number of available unused characters in at least one of the one or more character-limited messages. Furthermore, in some cases, the computing platform may cause the message security system to determine an expiration of the shortened URL based on the length of the random token.

In one or more embodiments, the one or more messages may comprise multiple character-limited messages, and the modification of the one or more character-limited messages further may comprise combining non-URL content of the multiple character-limited messages into a single character-limited message comprising the non-URL content and the shortened URL.

In one or more embodiments, the computing platform may modify the one or more character-limited messages by re-arranging non-URL content of the one or more character-limited messages. In some cases, the computing platform may re-arrange the non-URL content based on a maximum number of characters that can be transmitted in a single character-limited message.

In one or more embodiments, the computing platform may modify the one or more character-limited messages by adding content describing the shortened URL to the one or more character-limited messages. In some cases, the computing platform may generate the added content based on a maximum number of characters that can be transmitted in a single character-limited message.

After detecting the URL for replacement, in some embodiments the computing platform may transmit an instruction, to a messaging service center, that causes the messaging service center to drop the one or more character-limited messages, wherein the causing of transmission comprises transmitting, to the messaging service center, the modified one or more character-limited messages for transmission to the user device.

In one or more embodiments, the one or more character-limited messages are received from a first messaging service center, wherein the causing of transmission comprises transmitting the modified one or more character-limited messages to a second messaging service center.

In one or more embodiments, the computing platform may, prior to the redirection of the user device to the detected URL, scan content hosted at the detected URL for malicious content; and after detecting that the content hosted at the detected URL does not contain malicious content, redirect the user device to the detected URL.

In one or more embodiments, the computing platform may further detect a potentially malicious phone number in the one or more character-limited messages; replace the potentially malicious phone number with a phone number assigned to the message security system; receive a call on the phone number assigned to the message security system; and redirect the call to the potentially malicious phone number. In some cases, prior to the redirection of the call, the computing platform may inform a caller that the detected phone number is a potentially malicious phone number.

BRIEF DESCRIPTION OF THE DRAWINGS

The present disclosure is illustrated by way of example and not limited in the accompanying figures in which like reference numerals indicate similar elements and in which:

FIGS. 2A-2B depict two illustrative logical flows for performing secure URL shortening for character-limited messages in accordance with one or more example embodiments:

DETAILED DESCRIPTION

Figure 1:
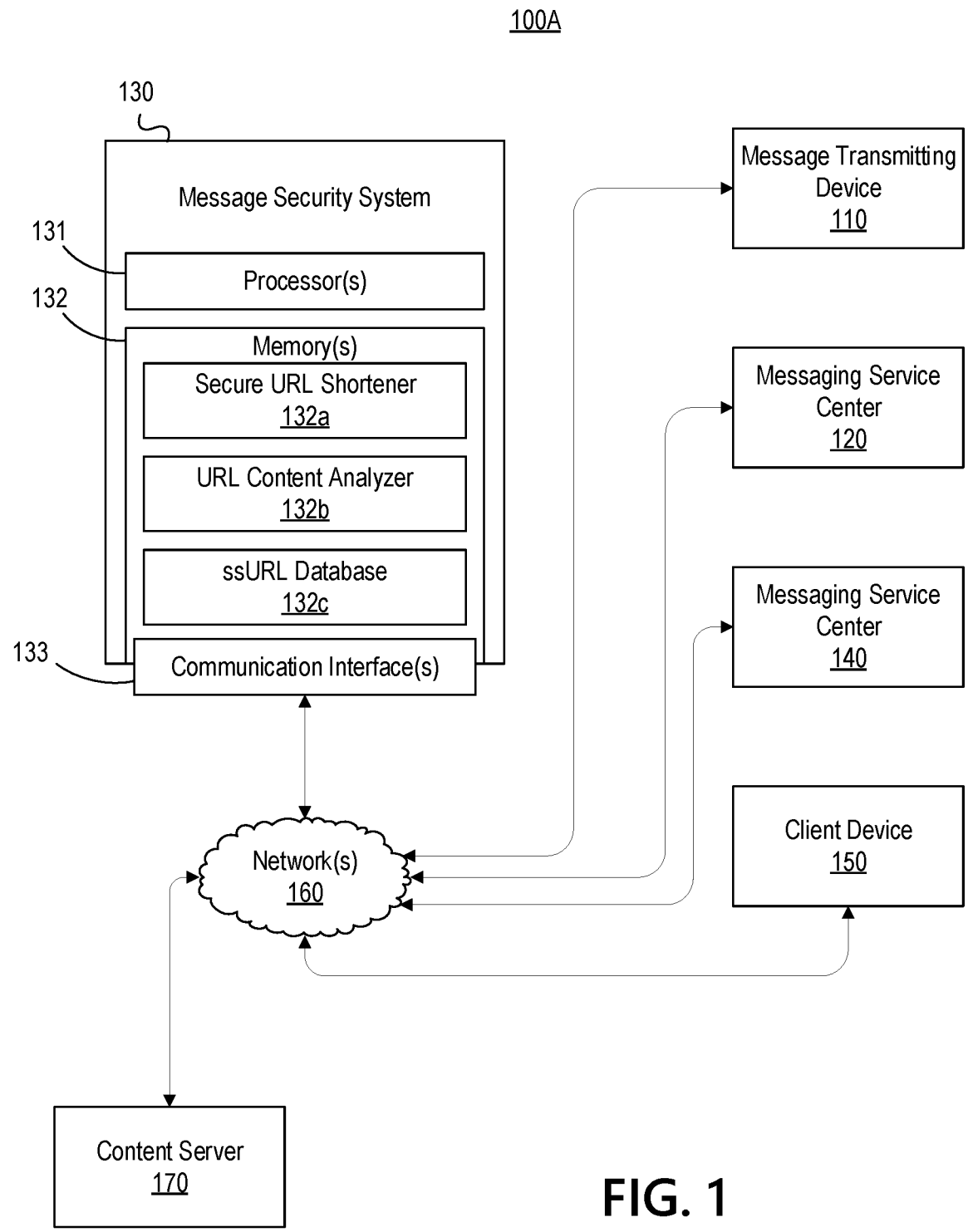
FIG. 1 depicts an illustrative operating environment for performing secure URL shortening for character-limited messages in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving security in electronic communications between users and/or communications sent from organization to users. More specifically, and as discussed in further detail below, solutions described herein provide improvements to telecommunications devices that are responsible for forwarding and/or scanning links embedded within character-limited messages (e.g., SMS text messages) sent to users. These character-limited messages may contain links to potentially harmful content, such as phishing attacks, viruses, and illegal and/or otherwise harmful content. Flagging this content as malicious presents unique issues in the context of character-limited messages, where each message can only contain a maximum number of characters and users may be charged per message (including in cases in which a single message might be split into multiple messages so that each falls within the character limit), and accordingly messages should be kept within a particular character limit.

One or more aspects of the disclosure thus provide technical solutions to various technical problems associated with providing security in the context of electronic messaging. For example, by detecting URLs within character-limited messages and replacing them with secure shortened URLs, electronic communications including character-limited messages may be made more secure without inconveniencing the user. In particular, the secure shortened URLs may be generated so as to avoid going over the character limits for a particular character-limited message, which may save on per-message charges for the user, as well as avoid cluttering a user's communications with extra characters. Several solutions are described for intelligently generating variable-length secure shortened messages in order to remain within character limits, as explained in more detail below.

Additionally, solutions described herein may be used to provide further information to users about the content that will be accessed when selecting a secure shortened URL. As described in detail below, descriptions of the content may be generated with variable amounts of detail in order to remain within character limits of the character-limited messages.

Furthermore, solutions described herein may be used to consolidate multiple character-limited messages into a single character-limited message using secure shortened URLs, which may save the user money on per-message fees, and/or provide a better user experience by providing one message instead of several messages. As described in detail below, when generating secure shortened URLs for replacing detected URLs within character-limited messages, multiple character-limited messages may be analyzed to detect whether they can be combined into a single character-limited message.

FIG. 1 depicts an illustrative operating environment for performing secure URL shortening for character-limited messages in accordance with one or more example embodiments. Referring to FIG. 1, computing environment 100 may include various computer systems, computing devices, networks, and/or other operating infrastructure. For example, computing environment 100 may include a message transmitting device 110, messaging service centers 120 and 140, a message security system 130, a client device 150, a content server 170, and one or more network(s) 160.

Network(s) 160 may include one or more wired networks and/or one or more wireless networks that interconnect the message transmitting device 110, messaging service centers 120 and 140, message security system 130, client device 150, content server 170, and/or other computer systems and/or devices. In addition, each of the message transmitting device 110, messaging service centers 120 and 140, message security system 130, client device 150, and content server 170 may be special purpose computing devices configured to perform specific functions, as illustrated in greater detail below, and may include specific computing components such as processors, memories, communication interfaces, and/or the like.

Message security system 130 may include one or more processor(s) 131, one or more memory(s) 132, and one or more communication interface(s) 133. In some instances, message security system 130 may be made up of a plurality of different computing devices (e.g., arranged as a computing platform), which may be distributed within a single data center or a plurality of different data centers. In these instances, the one or more processor(s) 131, one or more memory(s) 132, and one or more communication interface(s) 133 included in message security system 130 may be part of and/or otherwise associated with the different computing devices that form message security system 130.

In one or more arrangements, processor(s) 131 may control operations of message security system 130. Memory(s) 132 may store instructions that, when executed by processor(s) 131, cause message security system 130 to perform one or more functions, as discussed below. Communication interface(s) 133 may include one or more wired and/or wireless network interfaces, and communication interface(s) 133 may connect message security system 130 to one or more networks (e.g., network 160) and/or enable message security system 130 to exchange information and/or otherwise communicate with one or more devices connected to such networks.

In one or more arrangements, memory(s) 132 may store and/or otherwise provide a plurality of modules (which may, e.g., include instructions that may be executed by processor(s) 131 to cause message security system 130 to perform various functions) and/or databases (which may, e.g., store data used by message security system 130 in performing various functions). For example, memory(s) 132 may store and/or otherwise provide a secure URL shortener 132a, a URL content analyzer 132b, and secure shortened URL (ssURL) database 132c. In some instances, the secure URL shortener 132a may store instructions that cause message security system 130 to implement a secure URL shortener for character-limited messages, and/or one or more other functions described herein. Additionally, the URL content analyzer 132b may store instructions that cause message security system 130 to implement a secure URL shortener for character-limited messages, and/or one or more other functions described herein. Furthermore, the ssURL database 132c may store data that may be used by message security system 130 in a secure URL shortener for character-limited messages, and/or in executing one or more other functions described herein.

Message transmitting device 110 may be configured to send character-limited messages using a communications service (e.g., SMS). The message transmitting device 110 may be a client device used by a user (e.g., in the case of one user sending an SMS to another user) or alternately could be a non-user device. For example, server devices are often used to send character-limited messages to large numbers of users, e.g. for notification purposes, for spam purposes, or sometimes to send malicious content as part of a cybersecurity attack. The message transmitting device 110 thus may include any device that sends a character-limited message for any purpose.

Client device 150 may be configured to be used by respective users (who may, e.g., be employees of an enterprise organization and/or customers of a communications service provider) to receive character-limited messages from the message transmitting device 110, as well as to send character-limited messages. The client devices could be user-owned devices, employer-provided devices, or other types of devices used by respective users. The client device 150 may be configured to present one or more user interfaces associated with messaging functions as described below.

As will be apparent to a person of ordinary skill, a communication system will have many client devices, and any given client device may be able to receive and send various types of messages, including character-limited messages, from and to any number of other devices, but the message transmitting device 110 and client device 150 described herein represent a respective sender and recipient in an example character-limited message transmission used to illustrate aspects of the disclosure. Thus, although the examples below describe the message transmitting device 110 sending exemplary character-limited message(s) to the client device 150, some aspects of the disclosure may include many client and/or message transmitting devices, all capable of sending various messages, including character-limited messages, to each other.

Messaging service centers 120 and/or 140 may be devices used by one or more communications service providers to forward electronic communications between devices, including to and from the message transmitting device 110 and the client device 150. As an example, the messaging service center may be and/or include an SMS-C (short message service center). The messaging service centers 120 and 140 may be located within communication networks that provide communication services to the message transmitting device 110 and/or client device 150. In one example, the messaging service center 120 may be part of a cellular or other network providing communications service to the messaging transmitting device 110, and the messaging service center 140 may be part of a cellular or other network providing communications service to the client device 150. In another example, both messaging service center 120, 140 may be part of a cellular network providing communications service to the client device 150, and the message transmitting device 110 might not have a wireless cellular communication.

Content server 170 may be and/or include one or more computing devices (e.g., servers, server blades, enterprise devices, or the like) that may be configured to host and provide content to client devices. For example, the content server 170 may be a web server configured to provide content accessible using one or more particular uniform resource locators (URLs).

Character-limited messages may include any message that can only fit a maximum number of characters in a single messages. One example of a character-limited message is a short message service (SMS) message because SMS messages can only fit 160 characters in a single message. Similarly, a multimedia messaging service (MMS) message is a character-limited message. Alternatively, a character-limited message may be any type of message with a character limit, including character-limited messages sent using social media networks and/or websites, other types of character-limited text messages besides SMS/MMS, and/or instant messages with a character limit.

FIGS. 2A-2B depict two illustrative logical flows for performing secure URL shortening for character-limited messages in accordance with one or more example embodiments. Referring to FIG. 2A, in some cases the message security system 130 may be outside the message flow of one or more example character-limited message(s). In this example, the character-limited message(s) sent by the message transmitting device 110 to the client device 150 may be initially received by the messaging service center 120. As described in more detail below, the messaging service center 120 may be configured to, prior to forwarding the message(s) on to messaging service center 140, first send the received message(s) to the message security system 130 for a security check and/or modification, and the message security system 130, in turn, may be configured to respond by indicating the original message(s) should be dropped and new and/or modified character-limited message(s) should be injected instead, as further described in detail below. The messaging service center 120 would then forward the injected character-limited message(s) on to the messaging service center 140 for eventual delivery to the client device 150. Thus, in this example architecture, the message security system 130 need not be tightly integrated into a communication provider network. Although FIG. 2A illustrates two messaging service center device within the message flow, fewer or more messaging service center devices could be included in a flow (e.g., depending on the distance between the message transmitting device 110 and client device 150, a particular network architecture, whether the message is sent across networks or within a network, etc.). Additionally, other devices could be included a flow. Additionally or alternatively, the messaging service center 140 (instead of the messaging service center 120) could send the message(s) to the message security system 130 for checking and/or modification.

Referring to FIG. 2B, in some cases the message security system 130 may be within a message flow. In this example, the message security system 130 may be integrated into one or more particular provider network(s), such that example character-limited message(s) may be received by the message security system 130 from a message transmitting device 110 and/or messaging service center 120, and may then perform security checking and or modification before forwarding the new and/or modified message(s) on towards the client device 150 for delivery. Thus, in this example, the message security system 130 may be tightly integrated into the messaging flow, which may be faster and more efficient.

Figure 3A:
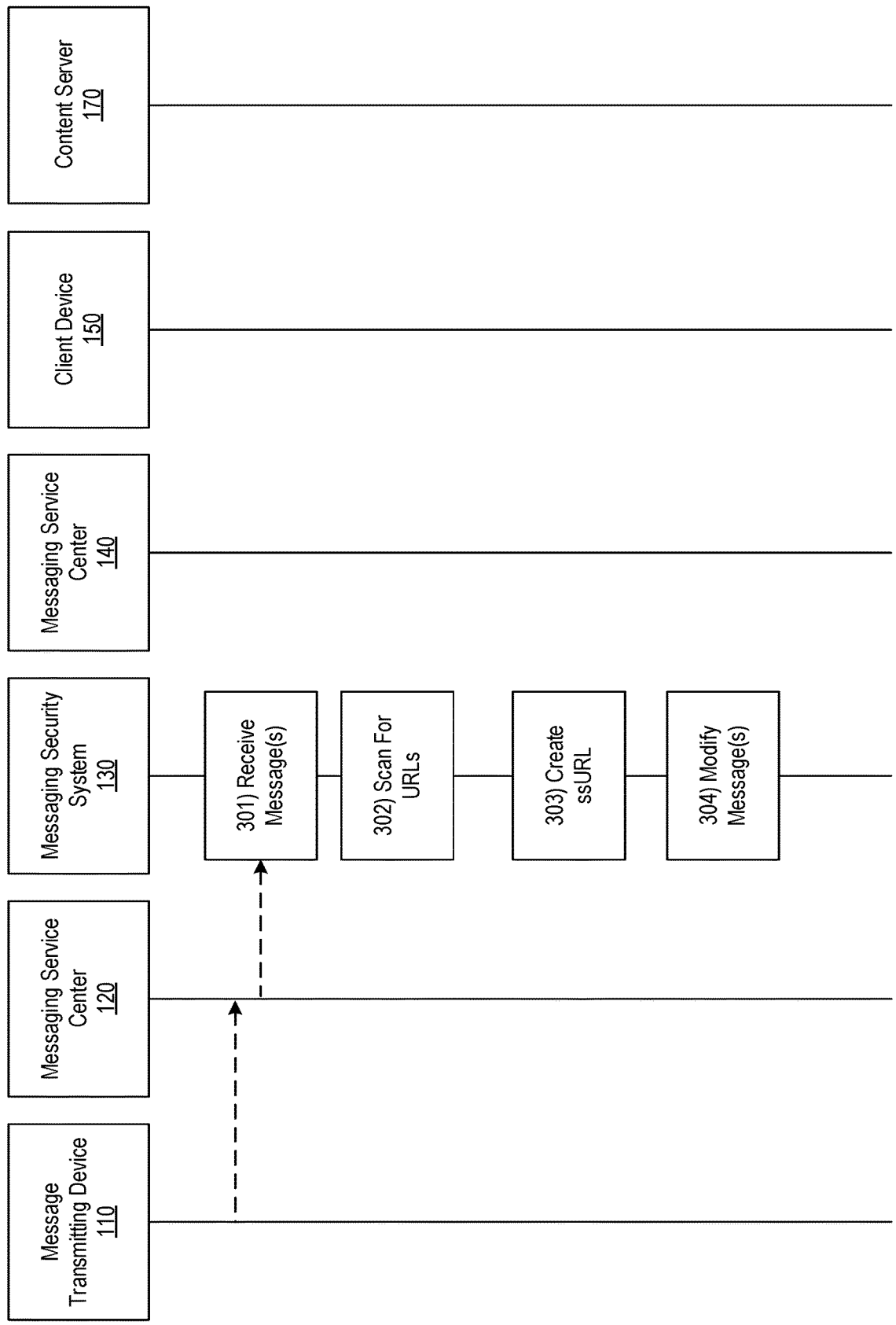
FIGS. 3A-3C depict an illustrative event sequence for performing secure URL shortening for character-limited messages in accordance with one or more example embodiments.
Figure 3B:
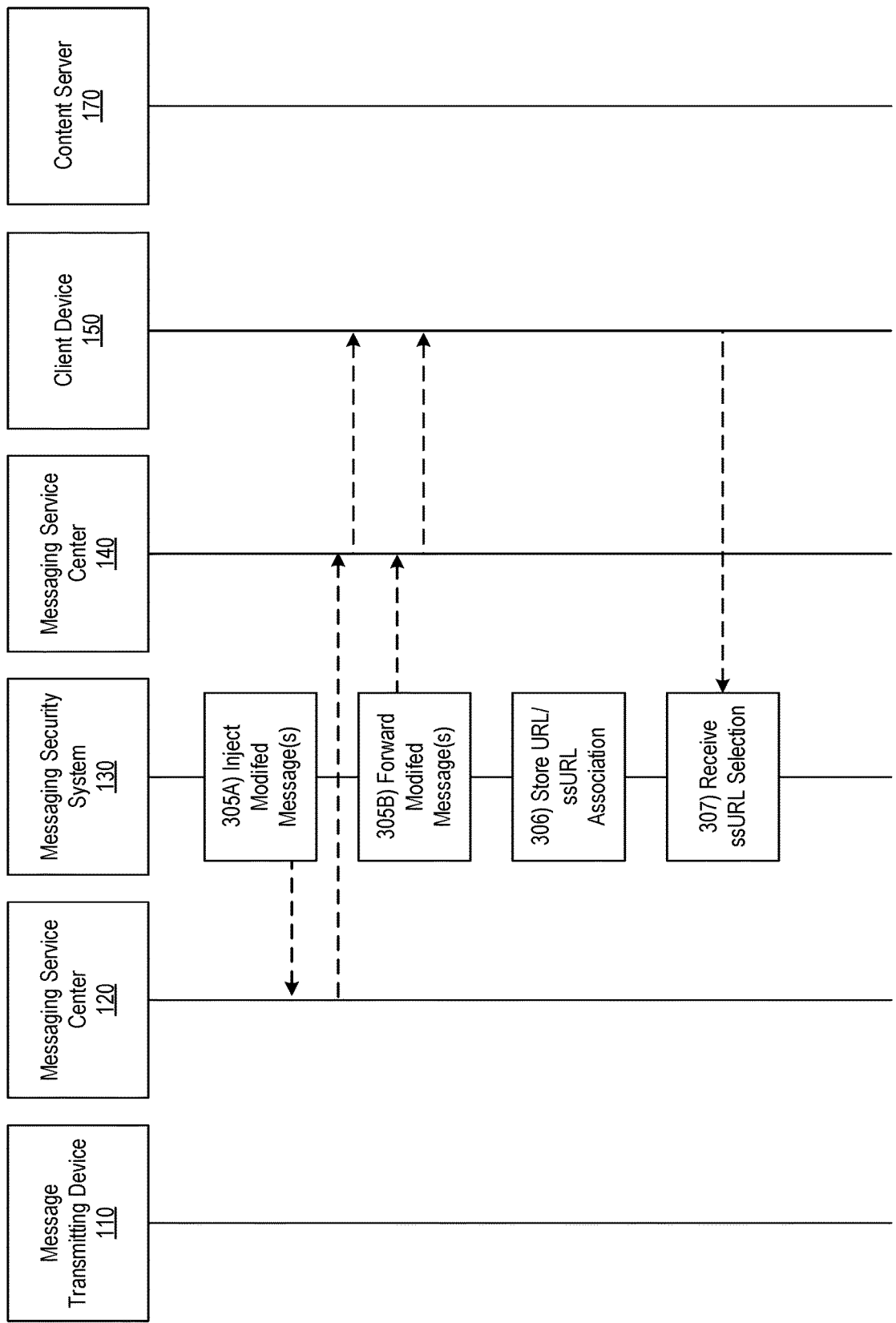
Figure 3C:
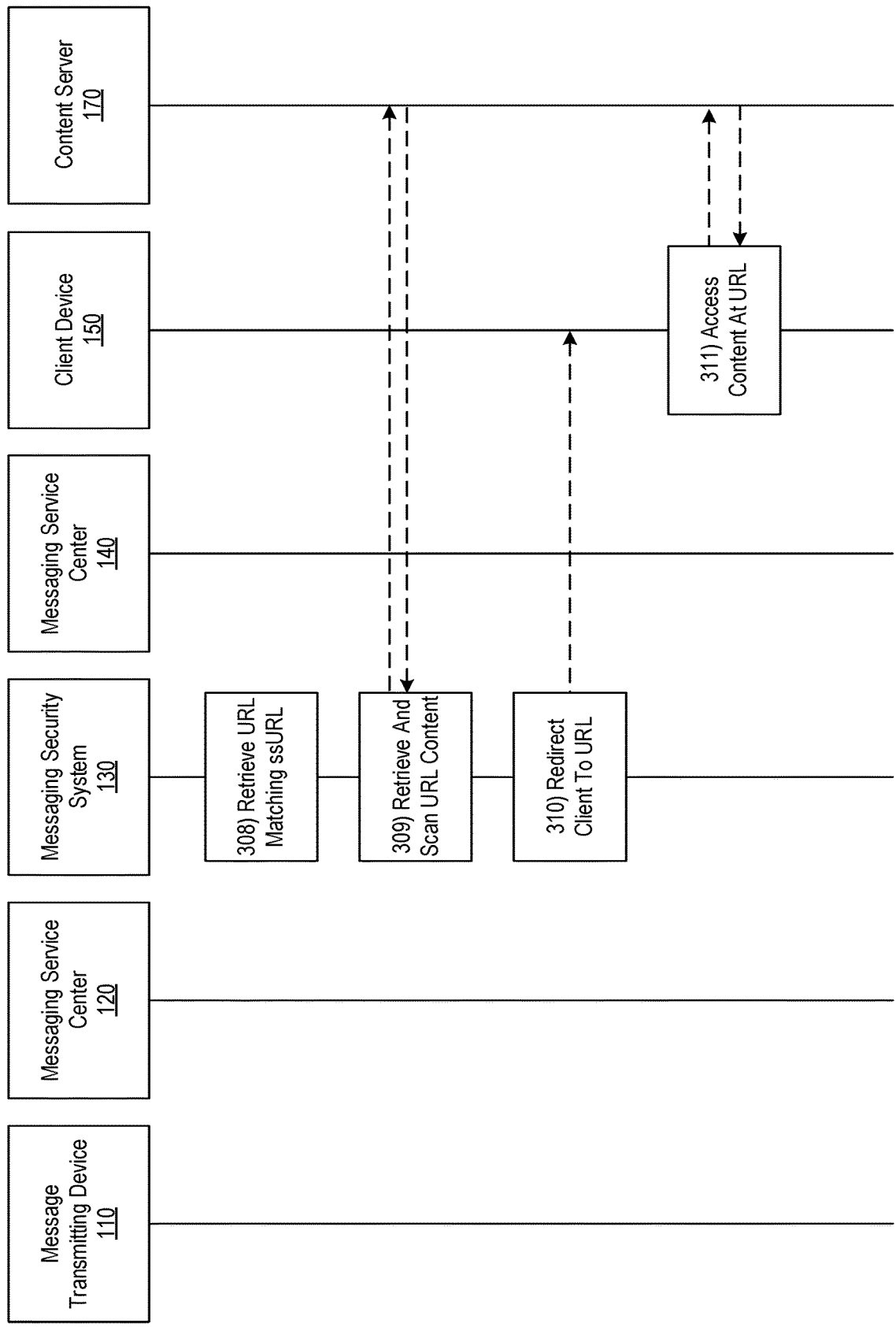

FIGS. 3A-3C depict an illustrative event sequence for performing secure URL shortening for character-limited messages in accordance with one or more example embodiments. Referring to FIG. 3A, at step 301 the message security system 130 receives one or more character-limited message(s) for delivery to the client device 150. In some cases, only a single message may be received at a time, and the message security system 130 may follow the steps described below for each individual message separately. In some cases, multiple messages may be received together or shortly apart, and the message security system 130 may act on the multiple messages together as part of the process described below. For example, if multiple messages are received within a time period (e.g. one second), the may be treated together. At step 302, the message security system 130 may scan the one or more messages to detect any uniform resource locators (URLs) embedded in text within the messages that should be removed and replaced with secure shortened URLs (ssURLs). For example, the message security system 130 may use regular expressions (regexps) to detect strings formatted as URLs. In some cases, URLs could be split across multiple messages, which the message security system 130 may detect by analyzing the text of multiple messages.

The message security system 130 may, in addition to or as an alternative to detecting URLs at step 302, scan for other types of calls-to-action (CTAs), such as phone numbers appearing within the text of the character-limited message. Because phone numbers or other CTAs may be used as part of cybersecurity attacks, for example within text messages encouraging users to call malicious numbers, certain steps as described below may be modified to detect and respond to the presence of potentially malicious phone numbers appearing within text messages.

At step 303, the secure URL shortener 132a of the message security system 130 may create one or more secure shortened URLs (ssURLs) to replace one or more of the detected URLs within the character-limited message(s). As described above, secure shortened URLs provide several benefits over URLs, especially in the context of character-limited text messages. First, they replace a URL, which may be potentially malicious, with a secure URL directing to a secure webserver that can scan the content at the original URL to ensure it does not contain malicious content (e.g., malware) before redirecting the user to the original URL. Second, the ssURLs may be shortened to ensure that they fit within a character-limited message. And third, they may allow a secure server to track attempts to spread malware, thus allowing for the easier identification of malicious actors. To create a ssURL, the message security system 130 starts with a secure domain address identifying a secure web server hosted by the message security system 130. As an example, the domain address may be "proof.pt/ssurl." The message security system 130 may then append a random token to the domain address to create a unique ssURL, such as "proof.pt/[random token]." As described in detail below, the ssURL may be associated with the original URL, so that a user can access the ssURL to be redirected to the content at the URL. Thus, for example, if two URLs detected in the one or more message(s) are to be replaced, two ssURLs may be generated, each one corresponding to one of the two URLs.

In some cases, the secure URL shortener 132a may only generate a ssURL if it decides that a URL appearing in the character-limited message(s) is untrusted. For example, URLs containing known safe domain names (e.g., youtube.com, apple.com, etc.) may be trusted, and a ssURL might not need to be generated to replace such URLs. Conversely, certain domain names may be known to be untrusted, and may be flagged accordingly. URLs that do not match either a known trusted or known untrusted domain may be treated as either trusted or untrusted by default, according to implementation. Similarly, certain subdomains of certain domain names may be trusted or untrusted (e.g., news.google.com may be trusted, whereas drive.google.com might not be trusted because it could be used to share uploaded content that may be potentially malicious). Additionally, certain full URLs could be flagged as trusted or untrusted (e.g., due to previously-detected malicious ads appearing at a certain URL, or other such information indicating a particular URL is untrusted). Thus, the secure URL shortener 132a of the message security system 130 may store (e.g., in ssURL database 132c) URL information and/or regular expressions for identifying URLs that may be trusted or untrusted. A more specific rule (e.g., drive.google.com is untrusted) may override a more general rule (e.g., google.com is trusted). The secure URL shortener 132a of the message security system 130 can then generate ssURLs if a particular detected URL does not match information indicating it is trusted and/or does match information indicating it is untrusted.

In some cases, the secure URL shortener 132a of the message security system 130 may generate a ssURL with additional information beyond the domain name and the random token. This additional information may indicate something about the content at the URL, which may help inform the user of what to expect if the user selects the ssURL. For example, the ssURL could include the domain name and/or any other part of the URL, such as "proof.pt/ssurl/google/[random token]," to indicate to a user that selecting the ssURL will ultimately redirect the user to a google.com URL. Additionally or alternatively, the additional information could indicate the type of content located at the URL (e.g., an image, a web page, etc.). As an alternative to including this information within the ssURL, text that is separate from the ssURL could be generated for inclusion in the character-limited message (e.g., appended after the ssURL). For example, the secure URL shortener 132a of the message security system 130 could generate a ssURL "proof.pt/ssurl/[random token]" with accompanying descriptive text such as "(image file hosted on google.com)" that could be inserted into a message next to the ssURL. This accompanying descriptive text could be formatted together with the URL using an HTML hyperlink tag (e.g., <a href="proof.pt/ssurl/[random token]">(image file hosted by google.com)</a>) or some other hypertext, or simply be formatted in plain text. As another example of providing additional information, the secure URL shortener 132a of the message security system 130 could access the content at the URL and take a screenshot of the content available at the URL, which could be appended as an image next to the ssURL within the message.

The random tokens used for the ssURLs may be of variable lengths. For example, when a character-limited message has a certain maximum number of characters (e.g., 160), and the message received will use less than the maximum number of characters before inserting a ssURL (e.g., the message contains 120 characters without the ssURL, so 40 characters are free for the ssURL), the length of the random token may be based on the maximum number of characters minus the used number of characters (e.g. 40 characters) such that the ssURL may fit within a single message while using as long of a random token as possible. Thus, a longer (and therefore more unique) will be used whenever possible without expanding the ssURL beyond the maximum characters limit.

The secure URL shortener 132a of the message security system 130 may also generate a timeout for each ssURL. The timeout provides an expiration, after which the random token used to generate the ssURL may be reused for another URL. For example, if the expiration period is one week, after a week the secure URL shortener 132a may reuse the random token and re-assign the ssURL to a new URL, in order to prevent the secure URL shortener 132a from running out of random tokens over time. In some cases, the secure URL shortener 132a of the message security system 130 may select a timeout period based on the length of the random token. For example, a ssURL with a 4-character random token may only last a day before expiring, whereas a ssURL with a 10-character random token may last a month before expiring.

At step 304, the message security system 130 may modify the received one or more character-limited message(s) by replacing the URLs with their replacement ssURLs and any additional information. In some cases, this step may involve re-arranging information within the one or more character-limited messages. For example, if two messages were sent from the message transmitting device 110, but the replacement of the URL with the ssURL shortens the content of the two message such that they can fit within a single message, the message security system 130 may combine the content of the two messages together with the ssURL into a single character-limited message. When the content of two messages is combined into one, extraneous information may be removed in some cases; for example, if the first message includes an indicator such as "1/2" indicating it is the first of two messages, and the second message includes an indicator such as "2/2" indicating it is the second of two messages, the message security system 130 may find these indicators (e.g., using a regexp) and avoid including them in the content of the combined message. Additionally, when multiple messages will be combined into one, the message security system 130 may select the length of the random token (e.g., as described in step 303) based on the number of characters that will be available in the combined message, so that the ssURL fits within the combined message; for example, the length of the random token may be selected based on the maximum number of characters that are available after condensing the content of two messages into a single message. As another example of modifying multiple messages, one or more ssURLs within the multiple messages may be re-arranged so as to avoid causing the ssURL to be split across two character-limited messages.

In some cases, instead of replacing a URL with a ssURL, the message security system 130 may decide that a particular URL contains malicious content, and may modify the character-limited message by simply deleting the URL from the character-limited message without replacing it with a ssURL. The message security system 130 may make such a decision based on a previous security scan that detected malware at the URL, or may perform a real-time scan of the content available at the URL after receiving the message containing the URL, which may reveal the presence of malicious content at the URL. In these cases, because the message security system 130 has identified the presence of malicious content to a high degree of confidence, the URL is removed entirely to block access to the malicious content. In such a case, the message security system 130 may replace the removed URL with explanatory text indicating that the URL contained malicious content and was removed for that reason.

Referring to FIG. 3B, step 305A may be performed in a system set up according to the example first architecture of FIG. 2A. In this example, the message security system 130 is not part of the message flow, so the message security system 130 may instruct the messaging service center 120 from which it received the one or more character-limited messages in step 301 to drop the original one or more character-limited messages and inject the modified one or more character-limited messages (i.e., as modified at step 304) into the message flow in place of the dropped message(s). Thus, the message security system 130 may transmit one or more instructions to the messaging service center 120 to cause the replacement of the original message(s) with the modified message(s), and the messaging service center 120 in turn may then prevent transmission of the original message(s) to the client device 150, and instead transmit the modified message(s) on to the next device in the message flow pathway (i.e., messaging service center 140), which in turn transmits the modified message(s) to the client device 150. The one or more instructions may include the full content of the modified message(s) and/or instructions for how the messaging service center 120 can modify the original message(s) to obtain the modified message(s). For example, the message security system 130 may indicate to the messaging service center 120 which URL should be replaced and provide the replacement ssURL, along with any other instructions for modifying the messages, or may simply send the modified message(s) in their entirety along with an indication of which message(s) the modified message(s) should replace.

As an alternative to step 305A, step 305B may be performed in a system set up according to the example second architecture of FIG. 2B. In this example, the message security system 130 is part of the message flow, so the message security system 130 may simply forward the modified character-limited message(s) to the next device (i.e., messaging service center 140) in the message flow pathway, which in turn sends the modified message(s) on to the client device 150, which is the destination client device for the message(s).

At step 306, the message security system 130 may store an association between a URL that was replaced and a corresponding ssURL that replaced the URL, so that a device that later accesses the ssURL may be redirected to the original URL. Such an association may be stored in the ssURL database 132c of the message security system 130. Alongside each association, a timeout (if any) may be stored. Once the time period indicated by the timeout has elapsed, the message security system 130 is free to reuse the ssURL associated with the timeout for another URL; in other words, the URL associated with the ssURL may be overwritten with a new URL and the timeout updated so that the new URL/ssURL association will be maintained for a new period set by the updated timeout. In addition, the message security system 130 may store other information along with the URL/ssURL association, such as a telephone number of the user/device that sent a particular character-limited message in which a corresponding URL was replaced with a ssURL, and/or a telephone number of the user/device to which the message was sent. Such information may be used by the message security system 130 to track the spread of potentially malicious URLs, including identifying bad actors that target users/devices with malicious URLs (e.g., by identifying telephone numbers that frequently send URLs linking to malicious content), and/or to identify users that are being targeted by potentially malicious URLs.

At step 307, the message security system 130 may receive a user request for content at the ssURL. For example, the user of the client device 150 may send an HTTP GET request, or a similar request, after the user selects the ssURL at the client device 150. The request may be received by the message security system 130, which may host a web server so that it may receive such requests when a user selects a ssURL (e.g., a URL including a proof.pt/ssurl domain address). In some cases, such a request may include a user agent string that may indicate information about the client device 150, such as a browser, operating system, and type of device. Turning to FIG. 3C, at step 308, the message security system 130 may retrieve the URL associated with the ssURL from the ssURL database 132c (e.g., as stored at step 306).

At step 309, after retrieving the URL, the message security system 130 may access the content at the URL from content server 170. Optionally, the message security system 130 may mimic (i.e., spoof) the user agent received from the user at step 307 when it accesses the content, so that it may receive the same content as the client device 150 would receive. The message security system 130 may then scan the content received for potentially malicious content.

If the message security system 130 determines that the content at the URL is known to be malicious, or is highly likely to be malicious, it may simply block access to the URL by not redirecting the client device 150 to the URL. In such a case, the message security system 130 may display a web page for the client device 150 indicating that the content was found to be malicious and access was blocked. Such a webpage could optionally include the original URL along with a warning against selecting the URL. When the content is determined to be malicious, the message security system 130 may further store an indication that malicious content was detected at the URL (e.g., in the ssURL database 132c). Then, when future message(s) contain the same or a similar URL (e.g., a URL using the same domain and/or subdomain as the URL with malicious content), the message security system 130 may simply remove the malicious URL from the message without replacing it with a ssURL, and/or may modify the message(s) that originally contained the URL to indicate that the content was determined to be malicious). However, the message security system 130 does not determine that the content at the URL is malicious or highly likely to be malicious, the method may proceed to step 310.

At step 310, the message security system 130 may redirect the client 150 to the URL. For example, the message security system 130 may send an HTTP redirect that causes the client device 150 to access the URL. At step 311, the client device may access the URL to obtain the content at the URL (i.e., the content hosted by the content server 170).

Figure 4:
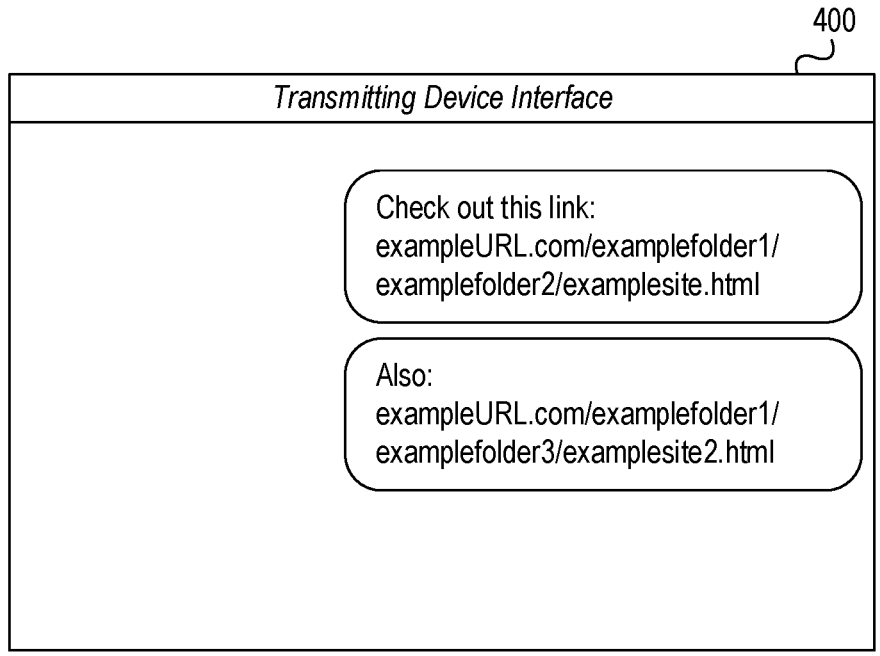
FIGS. 4-7 depict illustrative user interfaces demonstrating the operation of a secure URL shortener for character-limited messages in accordance with one or more example embodiments.
Figure 5:
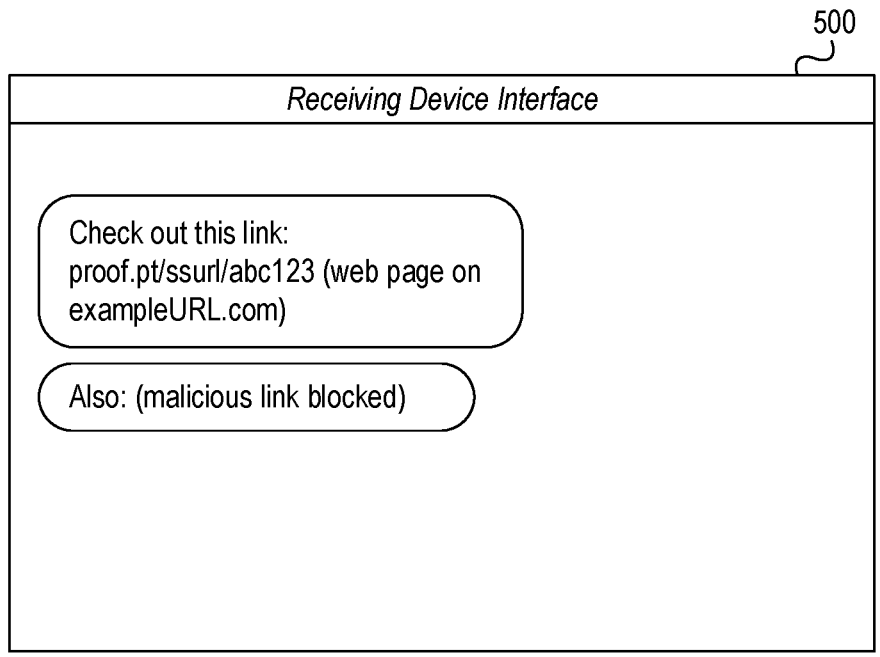

FIGS. 4 and 5 depict illustrative user interfaces demonstrating the operation of a secure URL shortener for character-limited messages in accordance with one or more example embodiments. In particular, FIGS. 4 and 5 illustrate several aspects of the disclosure described above. FIG. 4 shows a potential graphical user interface that may be used by a transmitting device (e.g., message transmitting device 110) that sends two example character-limited messages to a client device 150. As shown in the figure, the two sent messages each contain a URL as well as text. By contrast, FIG. 5 shows a potential graphical user interface that may be used by a receiving device (e.g., client device 150) that receives the two example messages after they are modified by the message security system 130. As illustrated, in the first example message, the message security system 130 replaced the URL with a ssURL and accompanying text describing the content that will be accessed if the ssURL is selected and the user is redirected to the URL, as described in the process of FIGS. 3A-3C. Although the message is a character-limited message, by replacing the longer original URL with a shorter ssURL, the message security system 130 frees up space in the character-limited message to add in the textual description of the type of content (e.g., "web site") and the domain name ("exampleURL.com") without going over the character limit for the message. Thus, in the first message, the receiving user can benefit from the security provided by the message security system 130 and still has information sufficient to decide whether the user wants to click on the link or not. In the case of the second message, in the illustrated example the message security system 130 has removed the link entirely, preventing access to the second URL in the second message that was sent by the transmitting device 110. In this example, the message security system 130 may have detected the presence of malicious content at the second URL during a previous scan (e.g., for another user), and therefore removed the message to block access to the malicious content at step 304. As shown in the figure, the message security system 130 inserted text into the modified message indicating that a malicious URL was blocked.

Figure 6:
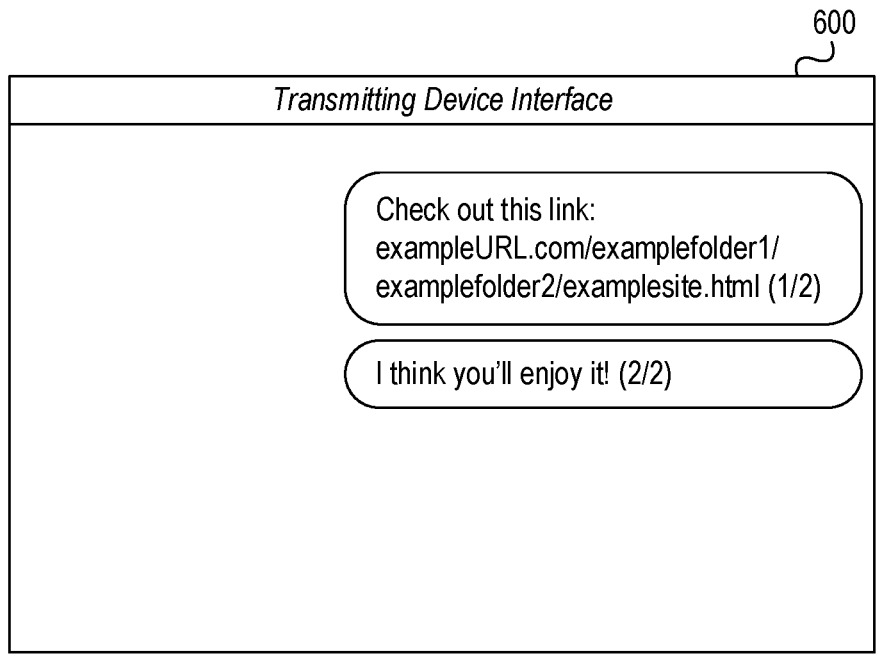
Figure 7:
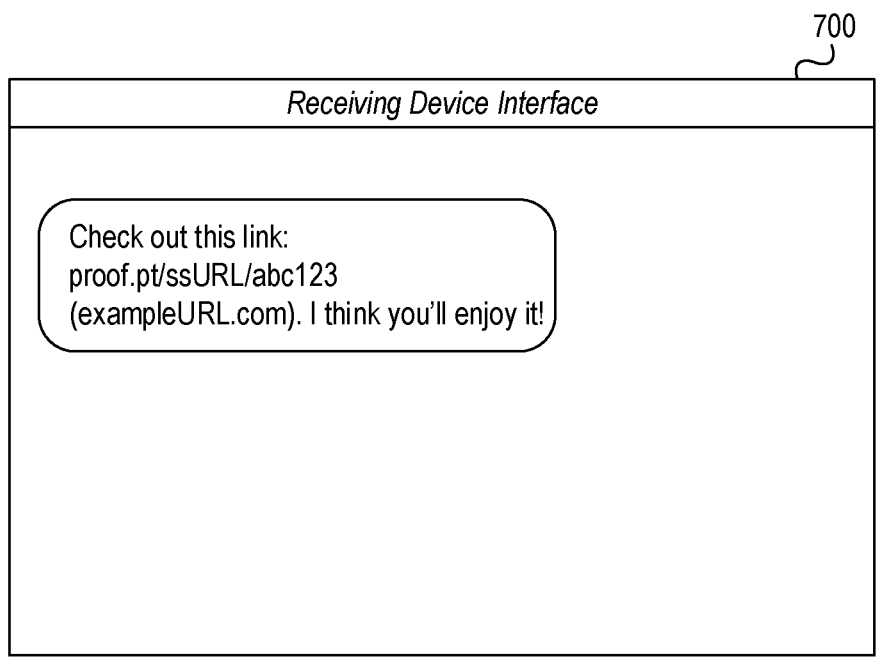

FIGS. 6 and 7 also depict illustrative user interfaces demonstrating the operation of a secure URL shortener for character-limited messages in accordance with one or more example embodiments. FIG. 6 shows a potential graphical user interface that may be used by a transmitting device (e.g., message transmitting device 110) that sends a long message that spans two example character-limited messages to a client device 150. By contrast, FIG. 5 shows a potential graphical user interface that may be used by a receiving device (e.g., client device 150) that receives the single example message that is created by modifying the content of the two sent messages at the message security system 130. As illustrated at FIG. 6, the message transmitting device 110 sends a long message that has more characters than a single character-limited message, and as a result the message is split into two character-limited messages. The first character-limited message contains a URL. However, as shown in FIG. 7, the message security system 130 has replaced the URL with a shorter ssURL, and has also consolidated the content of the two messages into a single character-limited message based on the use of the shorter ssURL, which freed up enough characters to consolidate the two character-limited messages into one. Additionally, the message security system 130 removed the multiple message indicators (i.e., "(1/2)" and "(2/2)") because they were no longer needed, and inserted a short textual description of the ssURL ("(exampledomain.com)") into the message based on the remaining number of characters available in the character-limited message. In other words, if more characters were unused, the message security system 130 could have included a longer and/or more detailed textual description of the ssURL. Additionally, the message security system 130 also used a relatively shorter random token (i.e., "abc1") for the ssURL based on the number of characters available in the character-limited message. If more characters were unused, the message security system 130 could have used a longer random token.

Figure 8:
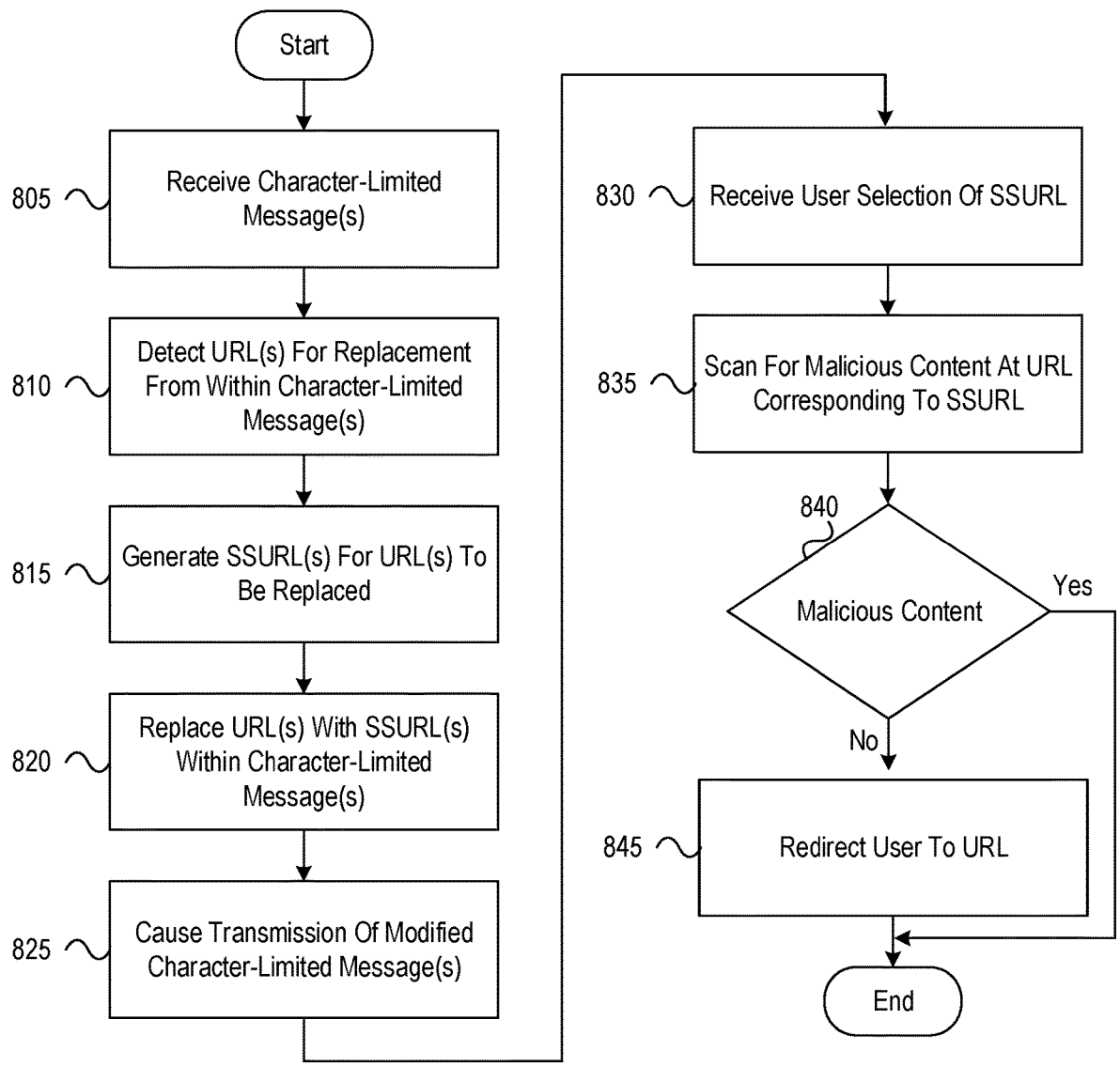
FIG. 8 depicts an illustrative method for performing secure URL shortening for character-limited messages in accordance with one or more example embodiments.

FIG. 8 depicts an illustrative method for performing secure URL shortening for character-limited messages in accordance with one or more example embodiments. Referring to FIG. 8, at step 805, a message security system having at least one processor, a communication interface, and memory may receive one or more character-limited message (e.g., from a messaging service center, which may receive the messages from a message transmitting device). At step 810, the message security system may detect one or more URLs within the character-limited messages for replacement (e.g., based on determining that the URL(s) are not trusted). At step 815, the message security system may generate a shortened URL for each URL that was determined to be replaced. At step 820, the message security system may modify the received messages by replacing the URL(s) that were determined to be replaced with shortened URLs. Then, at step 825, the message security system may cause transmission of the modified messages (e.g., to an messaging service center, which will forward the modified message(s) on for eventual delivery to a client device).

Next, at step 830, the message security system may receive a user request for content based on the user selecting the shortened URL. In response, at step 835, the message security system may retrieve the URL corresponding to the shortened URL and access the content at the URL so that it can be scanned for malicious content. At decision 840, the message security system scans the content to detect whether or not the content is malicious. If the message security system detects that the content is not malicious, the message security system may then, at step 845, redirect the user to the content at the URL. However, if the message security system detects that the content is malicious, it may avoid redirecting the user by skipping step 845, thus ending the process without redirecting the user to the malicious content.

The analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A message security system comprising:
one or more processors;
a communication interface; and
memory storing computer-readable instructions that, when executed by the one or more processors, cause the message security system to:
receive, via the communication interface, one or more character-limited messages sent to a user device;
detect a Uniform Resource Locator (URL) within the one or more character-limited messages for replacement;
generate a shortened URL corresponding to the detected URL, wherein a domain of the shortened URL is hosted by the message security system, and wherein generating the shortened URL includes:
generating a random token based on a maximum number of characters that can be transmitted in a single character-limited message, wherein a length of the random token is selected based on a number of available unused characters in at least one of the one or more character-limited messages; and
generating a shortened URL comprising the domain and the generated random token, and
modify the one or more character-limited messages by replacing the URL with the shortened URL;
cause transmission of the modified one or more character-limited messages to the user device;
receive, via the communication interface, from the user device, a request to access the shortened URL;
redirect the user device to the detected URL corresponding to the shortened URL; and
determine an expiration of the shortened URL based on the length of the random token.

2. The message security system of claim 1, wherein the one or more character-limited messages comprise at least one of short message service (SMS) messages and multimedia messaging service (MMS) messages.

3. The message security system of claim 1, wherein the detection of the URL for replacement comprises:
detecting a URL within the one or more character-limited messages; and
identifying that the URL is not trusted,
wherein replacing the URL with the shortened URL comprises replacing the URL in response to identifying that the URL is not trusted.

4. The message security system of claim 1, wherein the generation of the shortened URL comprises:
assigning an expiration to the shortened URL; and
storing an association between the shortened URL and the URL until at least the expiration.

5. The message security system of claim 1, wherein the one or more character-limited messages comprise multiple character-limited messages, and wherein the modification of the one or more character-limited messages further comprises combining non-URL content of the multiple character-limited messages into a single character-limited message comprising the non-URL content and the shortened URL.

6. The message security system of claim 1, wherein the modification of the one or more character-limited messages further comprises re-arranging non-URL content of the one or more character-limited messages.

7. The message security system of claim 6, wherein the re-arranging of the non-URL content is based on a maximum number of characters that can be transmitted in a single character-limited message.

8. The message security system of claim 1, wherein the modification of the one or more character-limited messages further comprises adding content describing the shortened URL to the one or more character-limited messages.

9. The message security system of claim 8, wherein the instructions, when executed, further cause the message security system to generate the added content based on a maximum number of characters that can be transmitted in a single character-limited message.

10. The message security system of claim 1, wherein the instructions, when executed, further cause the message security system to:
after the detection of the URL for replacement, transmit an instruction, to a messaging service center, that causes the messaging service center to drop the one or more character-limited messages,
wherein the causing of transmission comprises transmitting, to the messaging service center, the modified one or more character-limited messages for transmission to the user device.

11. The message security system of claim 1, wherein the one or more character-limited messages are received from a first messaging service center, wherein the causing of transmission comprises transmitting the modified one or more character-limited messages to a second messaging service center.

12. The message security system of claim 1, wherein the instructions, when executed, further cause the message security system to:
prior to the redirection of the user device to the detected URL, scan content hosted at the detected URL for malicious content; and
after detecting that the content hosted at the detected URL does not contain malicious content, redirect the user device to the detected URL.

13. The message security system of claim 1, wherein the instructions, when executed, further cause the message security system to:
detect a potentially malicious phone number in the one or more character-limited messages;
replace the potentially malicious phone number with a phone number assigned to the message security system;
receive a call on the phone number assigned to the message security system; and
redirect the call to the potentially malicious phone number.

14. The message security system of claim 13, wherein the instructions, when executed, further cause the message security system to:
prior to the redirection of the call, inform a caller that the detected potentially malicious phone number is a potentially malicious phone number.

15. A method comprising:
at a message security system comprising one or more processors, a communication interface, and memory storing computer-readable instructions:
receiving, via the communication interface, one or more character-limited messages sent to a user device;
detecting a Uniform Resource Locator (URL) within the one or more character-limited messages for replacement;
generating a shortened URL corresponding to the detected URL, wherein a domain of the shortened URL is hosted by the message security system, and wherein generating the shortened URL includes:

generating a random token based on a maximum number of characters that can be transmitted in a single character-limited message, wherein a length of the random token is selected based on a number of available unused characters in at least one of the one or more character-limited messages; and generating a shortened URL comprising the domain and the generated random token, and modifying the one or more character-limited messages by replacing the URL with the shortened URL;

causing transmission of the modified one or more character-limited messages to the user device;

receiving, via the communication interface, from the user device, a request to access the shortened URL;

redirecting the user device to the detected URL corresponding to the shortened URL; and determine an expiration of the shortened URL based on the length of the random token.

16. The method of claim 15, wherein the one or more character-limited messages comprise at least one of short message service (SMS) messages and multimedia messaging service (MMS) messages.

17. One or more non-transitory computer-readable media comprising instructions that, when executed by an apparatus comprising one or more processors and a communication interface, cause the apparatus to:

receive, via the communication interface, one or more character-limited messages sent to a user device;

detect a Uniform Resource Locator (URL) within the one or more character-limited messages for replacement;

generate a shortened URL corresponding to the detected URL, wherein a domain of the shortened URL is hosted by a message security system, and wherein generating the shortened URL includes:

generating a random token based on a maximum number of characters that can be transmitted in a single character-limited message, wherein a length of the random token is selected based on a number of available unused characters in at least one of the one or more character-limited messages; and generating a shortened URL comprising the domain and the generated random token, and modify the one or more character-limited messages by replacing the URL with the shortened URL;

cause transmission of the modified one or more character-limited messages to the user device;

receive, via the communication interface, from the user device, a request to access the shortened URL;

redirect the user device to the detected URL corresponding to the shortened URL; and determine an expiration of the shortened URL based on the length of the random token.

* * * * *